April 14, 1964

J. L. KINDMAN 3,129,114

MACHINE FOR APPLYING DRY COATINGS TO FROZEN
CONFECTIONS AND THE LIKE

Filed April 16, 1962

INVENTOR.
JOSEPH L. KINDMAN
BY Richard J. Rawling
ATTORNEY

INVENTOR.
JOSEPH L. KINDMAN
BY Richard Newling
ATTORNEY

April 14, 1964 J. L. KINDMAN 3,129,114
MACHINE FOR APPLYING DRY COATINGS TO FROZEN
CONFECTIONS AND THE LIKE
Filed April 16, 1962 4 Sheets-Sheet 4

INVENTOR.
JOSEPH L. KINDMAN
BY
Richard J. Cowling
ATTORNEY

United States Patent Office 3,129,114
Patented Apr. 14, 1964

3,129,114
MACHINE FOR APPLYING DRY COATINGS TO FROZEN CONFECTIONS AND THE LIKE
Joseph L. Kindman, East Rockaway, N.Y., assignor to Fulton Engineering Co., Inc., Long Island City, N.Y., a corporation of New York
Filed Apr. 16, 1962, Ser. No. 187,538
6 Claims. (Cl. 118—24)

The present invention relates generally to an apparatus for coating articles with dry particles of granular materials, and it has specific relation to apparatus for simultaneously enrobing a plurality of depending frozen confections with a granular coating of finely chopped nut meats, shredded cocoanut, cracker crumbs and the like.

Heretofore, apparatus has been used for coating frozen confections and the like with a dry granular material either by a gravity discharge of the material over said confections or by means of a rotor capable of spraying the coating material upwardly onto the surfaces of depending confections. This latter type apparatus has rotary conveyor means for collecting the excessive material from the bottom of the machine and redelivering it to the rotor for recirculation. The main objection to these machines was that not all surfaces of the confections received a uniform coating. In the gravity discharge type of machines, the bottom surfaces of the confections received little or no coating, and in the rotor type machine the top surfaces of the confections were likewise treated insufficiently.

The aforementioned disadvantages of the aforesaid types of machines have been obviated with the present invention, and a very satisfactory and uniform coating can be applied to all surfaces of the confections with a fraction of the amount of coating material heretofore required. The small quantity of recirculated coating material, which is constantly being replaced by new material, does not have a chance to become wet and soggy with drippings from the confections to be coated and does not get recirculated to a degree whereby it becomes pulverized through long periods of continuous recirculation.

An object of the present invention is to provide a new, simple, inexpensive and highly sanitary apparatus that may be installed in the line of large commercial rotary and/or straight line frozen confection machines having capacities between 600 and 1,000 dozens an hour with a minimum of effort and expense.

Another object of the invention is the provision of apparatus which may be easily and quickly taken apart for cleaning purposes.

A further object of the invention is to provide apparatus, including an enrobing chamber within which are mounted a pair of spaced elongated rotary units having oppositely rotating blades, for spraying a dry coating material efficiently and gently throughout said chamber and over the wet and sticky surfaces of a row of confections inserted therebetween, and reciprocating means for continuously moving the coating particles gravitating and collecting on the bottom of said enrobing chamber below said confections into the paths of said rotating blades for recirculation.

Another object of the invention is the provision of an automatic feeding unit which is capable of deliverying a continuous stream of a controlled and variable volume, which feeding unit may be readily removed when it is desired to clean the machine.

A further object of the invention is the provision of a dry coating apparatus having an enclosed slotted enrobing chamber within which operates a spaced pair of oppositely rotating blades for spraying the coating material throughout said enrobing chamber and over the wet and sticky surfaces of the confections positioned therebetween, and which has reciprocating means for preventing any build up or collection of coating material on the bottom of said chamber by continuously moving it back and forth into the paths of said rotating blades.

Another object of the invention is to provide an apparatus of the class described including an enclosed housing having a removable end plate on which are mounted the driving gears for the rotary units, the assembled units being capable of withdrawal from said enrobing chamber with said removable end plate.

Other and further objects and advantages of the invention reside in the detailed description of the apparatus, which result in simplicity, economy and efficiency, and which will be apparent from the following description, wherein a preferred embodiment is shown, reference being had to the accompanying drawings, forming a part hereof, wherein like numerals indicate like parts, in which.

Figure 2:
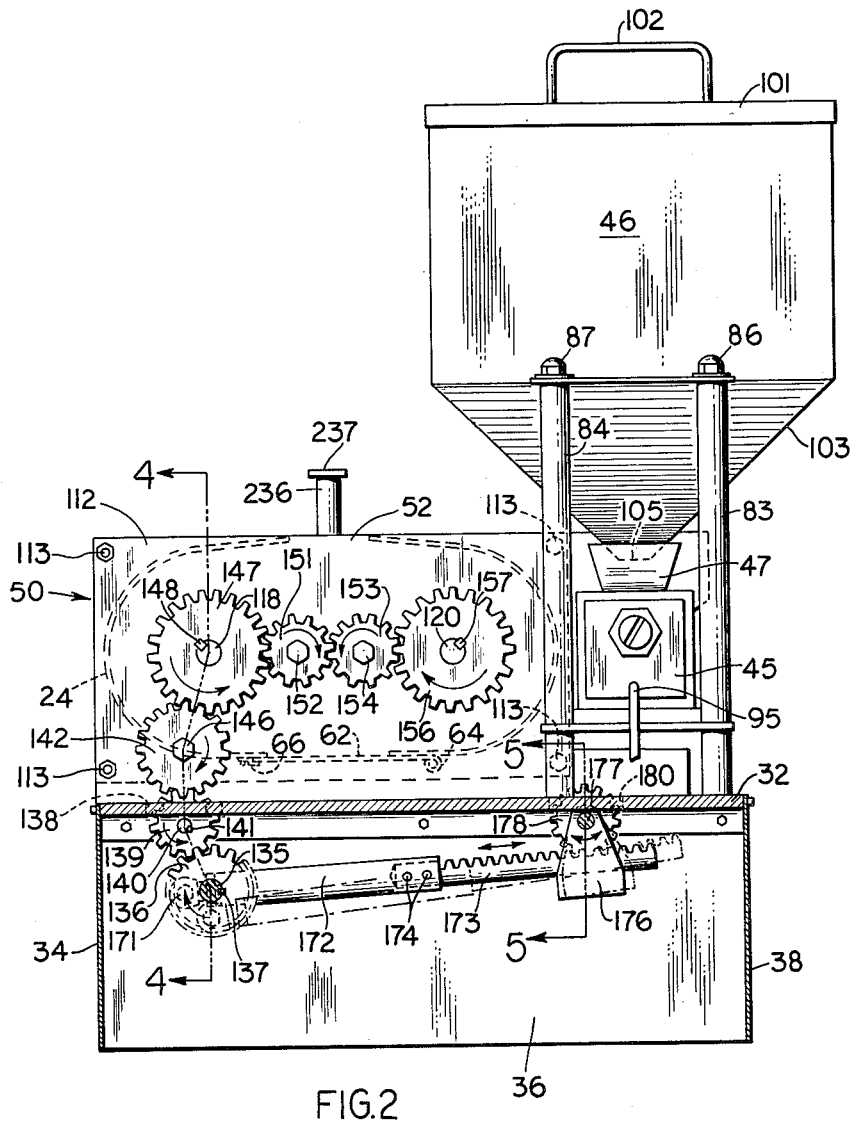
FIGURE 2 is a cross-sectional view of the apparatus shown in FIGURE 1, the same having been taken substantially along the line 2—2 thereof, looking in the direction of the arrows.
Figure 4:
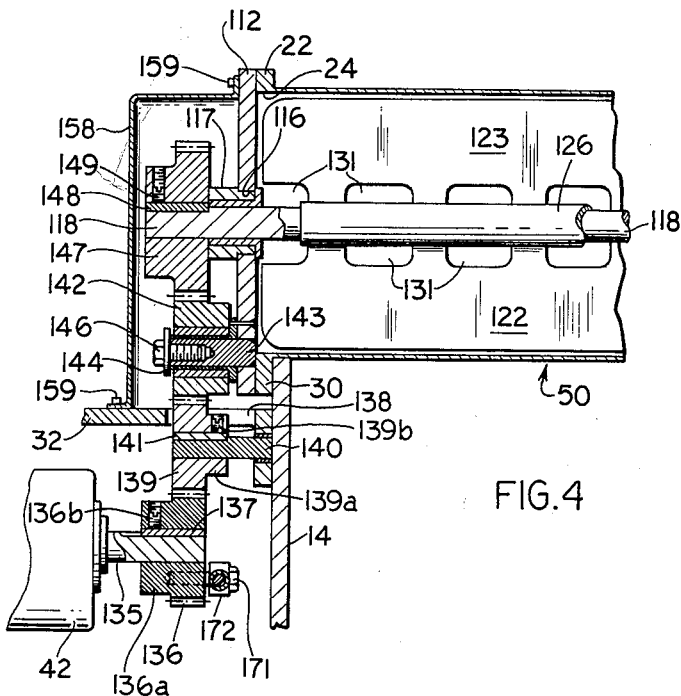
Figure 5:
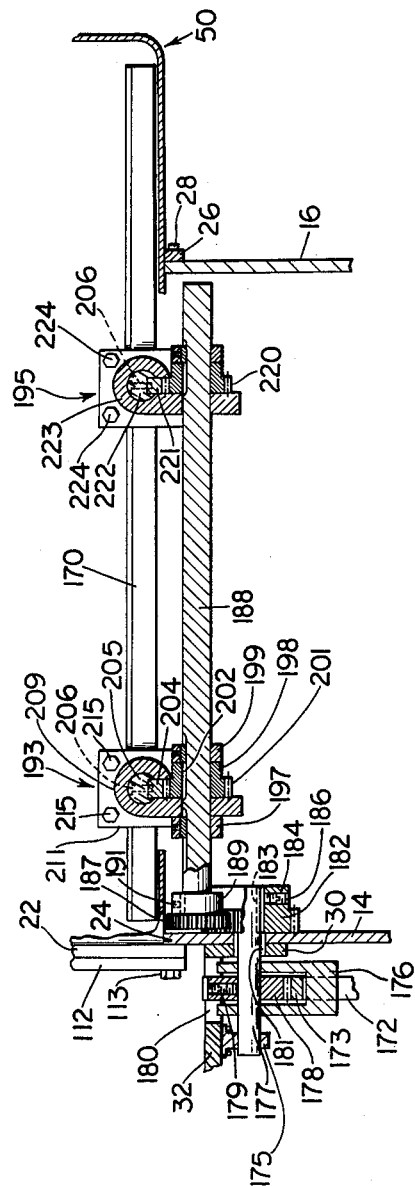

FIGURE 4 is a slightly enlarged fragmentary sectional view of the apparatus shown in FIGURE 2, the same having been taken substantially along the line 4—4 thereof, looking in the direction of the arrows, which illustrates the gear driving mechanism and the mounting of the driving shafts of the rotary units through the removable end cover plate of the enrobing chamber; and FIGURE 5 is a slightly enlarged longitudinal sectional view of the apparatus shown in FIGURE 2, the same having been taken substantially along the line 5—5 thereof, looking in the direction of the arrows, which illustrates the driving mechanism for the reciprocating means operating within the enrobing chamber.

Figure 1:
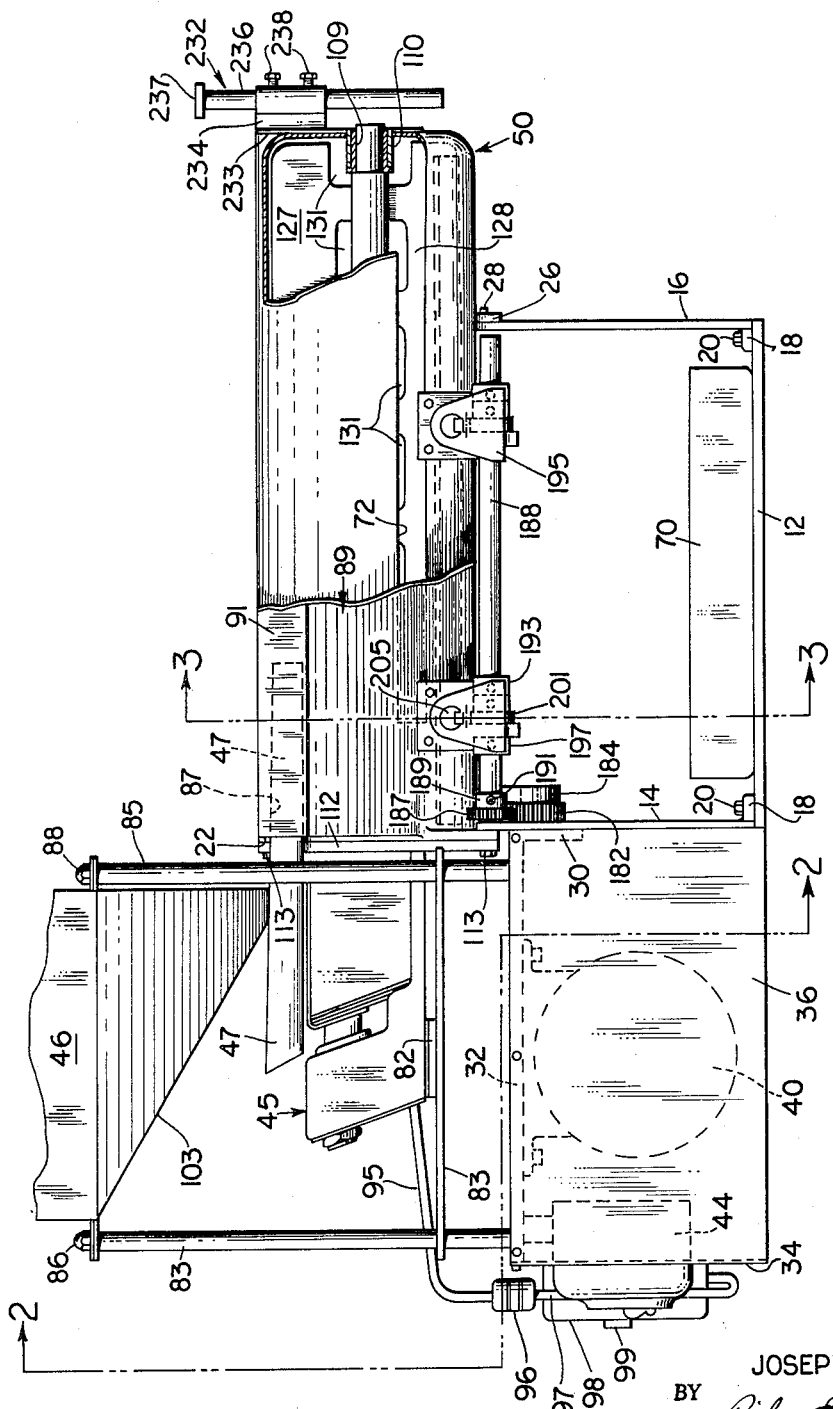
FIGURE 1 is a side elevational view of an apparatus constructed in accordance with the principles of the invention with portions of its cover plates removed or broken away to better illustrate internal features.

Referring now to the drawings, and particularly to FIGURE 1 thereof, there is shown a main supporting structure including a base plate 12, having spaced upstanding end plates 14 and 16. The end plates 14 and 16 each has a metal bar 18 welded adjacent the lower edge thereof by which they are secured to the base plate 12 by bolts 20. The end plate 14 has a vertical extension plate 22 welded to the top edge of its outer side. The plate 22 is provided with a large central opening 24, which opening is substantially oval in shape. The opposite end plate 16 has a plate 26 mounted on the top edge of its outer side by bolts 28. The rectangular plates 22 and 26 provide supports for the mounting of an enrobing chamber.

The upstanding end plate 14 also has a supporting bar 30 welded to its top edge below the extension plate 22. A horizontally extending plate 32 has its inner end welded to the top of the bar 30, and has its outer side edges supported by upstanding plates 34, 36 and 38, which also serve as cover plates. The underside of the plate 32 serves as a mounting for an electric motor 40, a gear reduction unit 42 and a control motor switch box 44. The upper surface of the plate 32 serves as a platform for mounting a conventional vibratory feeding unit 45, a supply hopper 46 and a vibratory feeding trough 47.

*The Enrobing Chamber*

Figure 3:
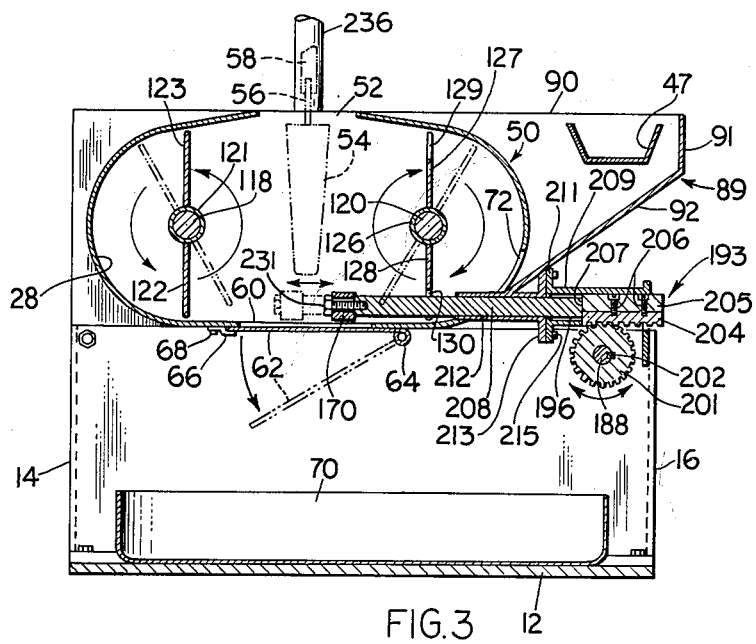
FIGURE 3 is a vertical sectional view of the apparatus shown in FIGURE 1, the same having been taken substantially along the line 3—3 thereof, looking in the direction of the arrows.

Referring now to FIGURES 1 and 3 there is shown an elongated enclosed housing 50, which is substantially oval in its cross-sectional shape. One end of the housing 50 is welded within the oval-shaped opening 24 of the plate 22, and an intermediate section of its bottom is supported by the top edges of the plates 16 and 26.

The housing 50 forms an enclosed elongated enrobing chamber, having a substantially flat bottom and top with sides substantially semi-circular in shape. An elongated slot 52 extends centrally of its top side through which a row of longitudinally spaced frozen confections 54 may be suspended by their respective handle sticks 56, each of which, in turn, is secured releasably in a conventional stick holding or clamping member 58 of a conventional conveyor system (not shown). It will be noted that the cross-sectional areas on each side of the slot 52 are substantially circular in cross-section, and it is within each of said areas that a rotary unit will be mounted axially thereof.

The bottom of the enrobing chamber 50 also has an elongated slot 60, which is normally closed by a door 62. The door 62 is hinged, as indicated at 64, to the underside of the chamber 50. A pivotal latch member 66 is secured to the underside of the chamber 50 adjacent the opposite edge of said slot 60 by means of a bolt 68 for holding the door 62 normally closed. A removable pan 70 is positioned on the base plate 12 directly under said door 62 for catching any coating material when the same is removed from said chamber 50 at the end of a production run.

The enrobing chamber 50 also has an elongated slot 72, which extends the entire length of one side and spaced above its bottom. The slot 72 is at all times in open communication with a feeding hopper to be hereinafter described in detail.

The Vibratory Feeder

A conventional vibratory feeder 45 is suitably and removably positioned on a raised platform 82, which, in turn, is mounted on the top of a supporting plate 83. The feeder 45 has a vibratory feeding trough 47 for moving the granular material from the supply hopper 46 to a feeding hopper 89, which is welded to the side of the apparatus. Referring now to FIGURE 3, the feeder housing 89 has a closed top 90, a straight side 91 and a sloping bottom 92, which terminates contiguously with the bottom of said slot 72 in the enrobing chamber 50. The dry feeder 45 is designed on the principle of flowing material vibration, whereby the flow of the comminuted coating material (not shown) may be very accurately controlled by electrically varying the amplitude of vibration.

The vibratory unit 45 is so quiet and free of any outward vibration that it does not have to be fastened down. Hence, it may be easily and quickly removed for cleaning purposes. The vibratory unit 45 has an electric cord 95 extending therefrom which is connected through a conventional separable plug 96 to a second electric cord 97. The other end of the electric cord 97 is connected to a conventional control box 98. The control box 98 is suspended removably on the outside of the plate 34, whereby it is removed easily and quickly when it is desired to clean the enrobing chamber 50. The box 98 has a knob 99 by which the vibrating unit 45 may not only be turned on, but by which its rate of feeding may be regulated in a conventional manner by merely turning its dial.

There is mounted on top of the plate 32 three spaced tubular columns 83, 84 and 85, each encircling mounting bolts 86, 87 and 88, respectively. These columns serve as a tripod support for the supply hopper 46, which is open at the top and has a removable cover 101, having a handle 102. The bottom 103 of the supply hopper 46 has sloping sides that tend to converge, forming a single restricted outlet 105. The outlet 105 is in vertical alignment with the feeding trough 47 of the vibratory feeder 45. (See FIGURE 2.)

The Rotary Units of the Enrobing Chamber

The enrobing chamber 50 has one end closed, as best shown in FIGURE 1. Mounted axially of the circular areas on opposite sides of the top slot 52 is a bushing 109 which, in turn, is mounted removably in a suitable bearing bracket 110.

The opposite open end of the enrobing chamber 50 is closed by a removable plate 112, which is secured to its supporting plate 22 at its four corners by bolts 113. The closure plate 112 has two transversely spaced apertures 116 therethrough, which are in axial alignment with the sleeve bearings 109 in the opposite closed end of the enrobing chamber 50. Fixedly mounted within each of said apertures 116 is a sleeve bearing 117. A horizontally extending shaft 118 is mounted between one pair of aligned sleeve bearings 109 and 117, which has its inner end journalled in one of said bearings 117. A second shaft 120 is mounted between the other pair of aligned sleeve bearings 109 and 117, which has its inner end journalled in the other of said bearings 117.

Referring now to FIGURE 3 and particularly to the left side of the enrobing chamber 50, there is shown a rotary unit comprising the shaft 118, a fixed hub 121 and a pair of diammetrically spaced blades 122 and 123, which are all welded together to form one rotary unit.

A second rotary unit is mounted on the right side of the enrobing chamber 50 on the shaft 120. It also has a fixed hub 126 and a pair of diammetrically spaced blades 127 and 128. The blades 127 and 128 of the second rotary unit each has a pair of longitudinally spaced notches 129 and 130 extending inwardly from their outer edges. These notches 129 and 130 provide clearance for the blades 127 and 128 to pass over a correspondingly spaced pair of rods forming a part of the reciprocating means operating within the enrobing chamber 50 and below said blades. Such means will hereinafter be more fully described.

It will be noted in FIGURES 1 and 4 that each of the blades of each of the rotary units has a series of longitudinally spaced openings 131. These openings 131 have no operating function, but are construction features found necessary to control the tendency of warping during the welding operations.

The Driving Mechanism for the Rotary units of the Enrobing Chamber

The driving gears for the rotary units are mounted on the end closure plate 112 in such a manner that, when it is removed, the shafts 118 and 120 with their blade assemblies may be withdrawn entirely from the enrobing chamber 50 so that they and the chamber may be hosed down, as is customary in a dairy plant, with both steam and hot rinse water.

Referring now to FIGURES 2 and 4, the main drive shaft 135 of the reduction gear unit 42 has a spur gear 136 keyed thereto, as indicated at 137. The gear 136 has an axially projecting hub 136a provided with a set screw 136b. The spur gear 136 enmeshes with a pinion gear 139, which likewise has an axial hub 139a and a set-screw 139b. The pinion gear 139 projects through a slot 138 in the plate 32. The pinion gear 139 is keyed on a stud shaft 140, by a key 141. The stud shaft 140 is mounted fixedly in a recess in the plate 14. The top of the pinion gear 139, which extends through the slot 138 and above the plate 32, engages a larger freely mounted gear 142 operating on a stud shaft 143 secured in the plate 30. The gear 142 is held in position on the stud shaft 143 by a washer 144 and bolt 146. The gear 142 enmeshes with a spur gear 147, which is keyed to the shaft 118 by a key 148. The spur gear 147 is held in alignment with the gear 142 on the shaft 118 by means of a set screw 149. Thus, it will be apparent that the gear 147, which is keyed to the shaft 118, will drive its rotary unit in the same direction in which it is operating.

Referring now to FIGURE 2, the driving gear 147 on the shaft 118 also engages a pinion gear 151 mounted to rotate freely on a fixed stud shaft projecting outwardly from the closure plate 112. A bolt 152 secures the gear 151 on said shaft. The pinion gear 151, in turn, drives a second pinion gear 153, which is similarly mounted on a fixed shaft projecting outwardly of the closure plate 112, and it is held on said shaft by a bolt 154. The second pinion gear 153 also enmeshes with a spur gear 156, which is suitably keyed to the shaft 120, as indicated at 157. It will be apparent from the above described gear train, wherein the direction of each gear is indicated by arrows, the shafts 118 and 120 are being driven upwardly towards each other and in opposite directions. Thus, the rotary units with their respective blades are being rotated oppositely. The entire gear train is enclosed within a suitable safety housing 158 secured by bolts 159.

*The Reciprocating Means*

The apparatus has reciprocating means extending longitudinally of the enrobing chamber 50, said reciprocating means including a bar 170 which moves back and forth across the bottom of said chamber. This bar 170 prevents any collection or build-up of the granular coating material on the bottom of said enrobing chamber 50 below the depending row of confections 54. The bar 170 keeps reciprocating constantly back and forth under and between said spaced rotary units to move by a push-or-pull motion the granular material collecting on said bottom into a position whereby the blades of one or the other of the rotary units will be constantly picking up said material and scattering it through the enrobing chamber 50 and around and over the confections 54.

Referring again to FIGURES 2 and 5, the driving mechanism for the reciprocating means 170 starts with a crank pin 171 mounted fixedly and eccentrically on the side of the driving gear 136 of the reduction gear unit 42. A crank arm 172 is mounted rotatably on said crank pin 171, and with each revolution of the driving gear 136, the crank arm 172 is reciprocated in substantially a horizontal path. The outer end of the crank arm 172 has a rack 173 connected thereto by machine screws 174. The back of the rack 173 is supported within the base of a U-shaped journal bearing 176, which, in turn, is suspended pivotally from a shaft 177. The end of the shaft 177, which projects outwardly of the U-shaped journal bearing 176, is journalled in a bearing supporting bracket 175 mounted to the underside of the plate 32. The shaft 177 also has a gear 178 mounted fixedly thereon by a set screw 179. The gear 178 projects upwardly and operates within a slot 180 in the plate 32. The rack 173 engages the gear 178, causing the same to be oscillated on its shaft 177 with each stroke of the crank arm 172.

Referring now to FIGURE 5, the gear 178 projects upwardly through a slot 180 in the plate 32. The shaft 177 extends through a sleeve bearing 181 mounted in the plates 30 and 14. It has a gear 182 keyed thereto, as indicated at 183. The gear 182 has a hub 184, which has a set screw 186 for holding on the shaft 177. The gear 182 enmeshes with a second gear 187 mounted thereabove, which, in turn, is keyed to one end of a shaft 188. The gear 187 has a hub 189, having a set screw 191 securing it on the shaft 188. The shaft 188 extends longitudinally of the enrobing chamber 50 slightly below the bottom and paralleling one side thereof. The shaft 188 is supported by spaced brackets 193 and 195.

Referring to FIGURE 3, there is shown a sectional view of the bracket 193, which is mounted between spacing collars 197, 198 and 199, that are, in turn, mounted on the shaft 188. Mounted within the bracket 193 and between the spacing collars 197 and 198 is a gear 201, which is keyed to the shaft 188 by a key 202. The gear 201 engages a rack 204. The rack 204 is secured removably to a back plate 205 by screws 206. The back plate 205 has its inner end welded, as indicated at 207, to the outer end of a connecting rod 208. The rack 204 and back plate 205 operate in a guide bracket 209, which has a flange 211. The connecting rod 208 operates in an elongated sleeve bearing member 212, having a flange 213. The flanges 211 and 213 are secured together by bolts 215. The forward end of the elongated sleeve bearing member 212 projects into the enrobing chamber 50, and is suitably welded thereto. The inner end of the connecting rod 208 projects into the enrobing chamber 50 to substantially its median axis.

The bracket 195 is similar to the bracket 193 and has a gear 220 keyed to the shaft 188, which, in turn, engages a rack 221 that is connected to a connecting rod 222 through a guide bracket 223, which, in turn, is connected by bolts 224 to an elongated bearing member identical to the bearing member 212. The inner end of the connecting rod 222 also projects into the enrobing chamber 50 to substantially its median axis.

The bar 170 is mounted longitudinally of the enrobing chamber 50 to the ends of the spaced connecting rods 208 and 222 by means of bolts 231, as best shown in FIGURE 3, and, of course, will be moved backwardly and forwardly by the corresponding movement of said rods.

When the gear 136 is driven, its crank pin 171 will rotate and cause the crank arm 172 to reciprocate. This reciprocating movement of the crank arm 172 is communicated to the rack 173, causing it to oscillate the gear 178, which will, in turn, oscillate the shaft 177. The oscillations of the shaft 177 will be transferred to the gear 182 keyed thereto. The gear 182 is enmeshed with the gear 187 that, in turn, is keyed to the shaft 188, and consequently will cause it to rock back-and-forth or oscillate.

The gears 201 and 220, being keyed to the shaft 188, will oscillate therewith, and, in turn, cause the racks 204 and 221 to reciprocate. The reciprocation of the gear racks 204 and 221 will, in turn, cause their connecting rods to be reciprocated. Since the bar 170 is mounted on their opposite inner ends, it will likewise be reciprocated, as best shown by the dotted lines in FIGURE 3.

*The Operation of the Machine*

Apparatus embodying the invention have been installed in conventional automatic frozen confection machines with little or no difficulty immediately after the coating tank. The conveyors for moving the elongated rows of confections through such machines are readily capable of being modified for introducing each row of its confections into the dry coating apparatus herein described through the slot 52 as depicted in FIGURE 3. Since the confections being made from time to time on such automatic machines vary greatly in size, shape and length, and since it has been found advisable to control the distance to which such confections 54 may be lowered into the enrobing housing 50, it has been found necessary to provide an adjustable stop 232 for limiting the distance to which the row of confections 54 may be lowered.

Referring now to FIGURE 1, there is shown mounted on the outer end of the enrobing chamber 50, a plate 233, which, in turn, supports a vertically mounted collar 234. A rod 236 has a platform 237 mounted horizontally on its upper end. The collar 234 has two threaded apertures for receiving machine bolts 238, which act as set screws for locking the rod 236 in adjustable fixed positions within the collar 234.

The automatic machines with which the invention has been and is being used are capable of producing from 600 to 1,000 dozens of confections per hour, depending upon their speed of operation and the number of confections in each row in the conveying mechanism. The blades of the rotating units in the enrobing chamber 50 should preferably operate at a rate of approximately one hundred and twenty revolutions per minute, but such rate of operation is not critical.

It has been found that there should be approximately four to five pounds of granular material within the enrobing chamber 50 when the first row of confections is inserted, and that the material being fed into the enrobing chamber 50 from the supply hopper 46 by the vibratory feeder 45 must be sufficient to maintain such a quantity of material within the enrobing chamber 50. This means a feeding capacity of approximately 40 to 50 pounds of coating material an hour. Some confections are only two ounces in weight while other confections are four ounces in weight. Obviously, there are great variations in the amount of material required at a given time. In the conventional vibratory feeder 45 described herein, the rate of flow of the dry coating material can be varied at will by merely turning its starting dial 99 to the proper setting.

The apparatus of the present invention is capable of applying a very uniform and completely satisfactory coating to all surfaces of each frozen confection with a very substantial savings in the amount of coating material required by the earlier coating machines. Spoilage of the dry coating materials from drippings from the wet, sticky, surfaces of the confections in the prior machines was very considerable since the coating material was constantly recirculated in and out of the enrobing chamber. With the present invention the coating material that enters the enrobing chamber 50 never leaves it except on the surfaces of the coated confections. The small amount of material maintained at any one time in the enrobing chamber 50 means less loss at the end of a production run since such material cannot be saved for future use in view of the fact it contains drippings from the confections being coated.

It will be noted in FIGURE 5 that the reciprocating bar 170, which preferably operates at a rate of approximately two hundred and forty reciprocations per minute, does not touch the bottom of the enrobing chamber 50, but is spaced slightly above it. Its speed of operation is not critical. This construction not only reduces friction but prevents the dry granular coating material from being crushed to a powder between said bar 170 and the bottom of said enrobing chamber.

Although I have described in detail only one form which my invention may assume, it will be apparent to those skilled in the art that the invention is not to be so limited, but that various modifications may be made therein without departing from the spirit thereof or from the scope of the appended claims.

What I claim is:

1. A machine of the class described, comprising an enclosed housing having a substantially flat bottom, spaced rotary spraying units having radial blades mounted within said housing, an opening in said housing through which a plurality of spaced frozen confections may be moved into the space between said spraying units, means for discharging granular material into said housing, reciprocating means operating within said housing and across the bottom thereof to move the coating material collecting on said bottom in alignment with the space between said rotary spraying units into the paths of the blades thereof for respraying over said confections, and means for operating said spraying units and said reciprocating means.

2. A machine of the class described, comprising an enclosed housing having a substantially flat bottom, spaced elongated spraying units having radial blades mounted within said housing above said bottom, an opening in said housing through which a row of longitudinally spaced frozen confections may be moved for positioning between said spraying units, a hopper for containing a supply of coating material, means for delivering a thin stream of coating material from said hopper to said housing, a reciprocating bar operating within said housing and across the bottom thereof below the space separating said spraying units to move the coating material collecting on said bottom into the paths of said blades for respraying over said confections, and means for operating said spraying units and said reciprocating means.

3. A machine of the class described, comprising an enclosed housing having a substantially flat bottom, spaced elongated rotary spraying units having radial blades mounted within said housing, an elongated opening in the top of said housing in vertical alignment with the space between said spraying units through which a row of longitudinally spaced frozen confections may be moved for positioning between said spraying units, a hopper for containing a supply of coating material, means for delivering said material from said hopper to said housing, a reciprocating bar operating within said housing and across the bottom thereof in alignment with the space between said spraying units to move the coating material collecting on said bottom into the paths of said blades for respraying over said confections, and means for operating said spraying units and said reciprocating means.

4. A machine of the class described, comprising an enclosed housing having a substantially flat bottom, spaced elongated rotary spraying units having radial blades mounted within said housing, an elongated opening in the top of said housing in vertical alignment with the space between said spraying units through which a row of longitudinally spaced frozen confections may be inserted and positioned between said spraying units, a hopper for containing a supply of coating material, means detachable from said machine for delivering said material from said hopper to said housing in a thin continuous stream, means for varying the quantity of material being delivered from said hopper to said housing, a reciprocating bar operating within said housing and across the bottom thereof in substantially vertical alignment with said confections to move the coating material collecting on said bottom into the paths of said blades for respraying over said confections, said bar being reciprocated in a plane parallel to and spaced from said bottom, and means for operating said spraying units and said reciprocating means.

5. A machine of the class described, comprising an enclosed housing having a substantially flat bottom, spaced rotary spraying units having radial blades mounted within said housing, an opening in said housing through which a plurality of spaced frozen confections may be moved into position between said spraying units, detachable means for discharging granular material into said housing, means reciprocating within said housing and across the bottom thereof in alignment with said confections positioned between said spraying units to move the coating material collecting on said bottom into the paths of the blades of said spraying units for respraying over said confections, and means for operating said spraying units and said reciprocating means, said housing having a removable end closure plate on which are mounted said spraying units and the driving gears connecting said units and said reciprocating means with their driving motor, whereby when said plate is removed from said housing, said spraying units and said driving gears are removed as an assembled part thereof.

6. A machine of the class described, comprising an enclosed housing having a substantially flat bottom, spaced rotary spraying units having radial blades mounted within said housing, an opening in said housing through which a plurality of frozen confections may be moved into position between said spraying units, a hopper for holding a quantity of dry coating material, detachable means for connecting said supply hopper to said housing, said detachable means having means for varying the quantity of dry coating material being delivered to said housing, bar means reciprocating within said housing and across the bottom thereof in alignment with said confections positioned between said spraying units to move the coating material collecting on said bottom into the paths of the blades of said spraying units for respraying over said confections, and means for operating said spraying units and said reciprocating means, said housing having a removable end closure plate on which are mounted said spraying units and the driving means connecting said units and said reciprocating means with their driving motor, whereby when said plate is removed from said housing, said spraying units and said driving means are removed as an assembled part thereof.

References Cited in the file of this patent

UNITED STATES PATENTS

| | | |
|---|---|---|
| 1,801,572 | Salerno | Apr. 21, 1931 |
| 2,311,709 | Taylor | Feb. 23, 1943 |
| 2,655,897 | Thompson | Oct. 20, 1953 |
| 2,666,410 | Budny | Jan. 19, 1954 |
| 2,689,544 | Habgood | Sept. 21, 1954 |
| 2,710,588 | Parry et al. | June 14, 1955 |
| 3,036,533 | Burt et al. | May 29, 1962 |